(12) United States Patent
Eltorai (10) Patent No.: US 12,514,491 B2
(45) Date of Patent: Jan. 6, 2026

(54) SYSTEM, METHODS, AND DEVICES FOR CERVICAL EVALUATION

(71) Applicant: Adam E. M. Eltorai, Marlborough, MA (US)

(72) Inventor: Adam E. M. Eltorai, Marlborough, MA (US)

(73) Assignee: Mosaic Ventures (SC), LLC, Guilford, CT (US)

( * ) Notice: Subject to any disclaimer, the term of this patent is extended or adjusted under 35 U.S.C. 154(b) by 0 days.

(21) Appl. No.: 18/195,054

(22) Filed: May 9, 2023

(65) Prior Publication Data

US 2023/0363696 A1 Nov. 16, 2023

Related U.S. Application Data

(60) Provisional application No. 63/340,069, filed on May 10, 2022.

(51) Int. Cl.
*A61B 5/00* (2006.01)
*A61B 1/00* (2006.01)
*A61B 1/05* (2006.01)
*A61B 1/303* (2006.01)

(52) U.S. Cl.
CPC ...... *A61B 5/4331* (2013.01); *A61B 1/000096* (2022.02); *A61B 1/00016* (2013.01); *A61B 1/00045* (2013.01); *A61B 1/05* (2013.01); *A61B 1/303* (2013.01); *A61B 1/0008* (2013.01)

(58) Field of Classification Search
CPC ............ A61B 5/4331; A61B 1/000096; A61B 1/00016; A61B 1/00045; A61B 1/05; A61B 1/303; A61B 1/0008
See application file for complete search history.

(56) References Cited

U.S. PATENT DOCUMENTS

| | | | | |
|---|---|---|---|---|
| 5,450,857 A | * | 9/1995 | Garfield | A61B 5/0075 600/587 |
| 2003/0114779 A1 | * | 6/2003 | Paltieli | A61B 34/20 600/588 |
| 2005/0049509 A1 | * | 3/2005 | Mansour | A61B 5/1076 600/476 |
| 2006/0089570 A1 | * | 4/2006 | Mansour | A61B 8/12 600/437 |
| 2007/0112251 A1 | * | 5/2007 | Nakhuda | A61B 17/435 600/114 |
| 2008/0167553 A1 | * | 7/2008 | Paltieli | A61B 5/1076 600/588 |
| 2011/0115891 A1 | * | 5/2011 | Trusty | A61B 1/00029 307/104 |
| 2014/0088360 A1 | * | 3/2014 | Kawaura | A61B 1/0052 600/110 |
| 2014/0187855 A1 | * | 7/2014 | Nagale | A61K 9/0034 128/834 |
| 2019/0008674 A1 | * | 1/2019 | Myers | A61F 6/08 |

(Continued)

*Primary Examiner* — Baisakhi Roy
(74) *Attorney, Agent, or Firm* — Armis IP Law, LLC (57) ABSTRACT

A system, methods, and device for visualizing, quantifying, and monitoring labor progression, comprises a soft-tipped endoscope adapted for transvaginal positioning; a camera disposed at a distal end of the endoscope and adapted for capturing image data; a data transmitter; a data receiver; a processor configured to analyze the images and quantify cervical and fetal position data; and a data display for care provider review.

22 Claims, 7 Drawing Sheets

(56) References Cited

U.S. PATENT DOCUMENTS

| | | | |
|---|---|---|---|
| 2019/0057620 A1* | 2/2019 | Eggert | G09B 23/28 |
| 2019/0307319 A1* | 10/2019 | Podpolucha | A61B 1/00096 |
| 2020/0107714 A1* | 4/2020 | Bar-Or | A61B 1/32 |
| 2021/0000337 A1* | 1/2021 | Kumar | A61B 1/008 |
| 2021/0186411 A1* | 6/2021 | Wang | G02B 26/0833 |
| 2021/0282628 A1* | 9/2021 | Tortola | A61B 8/4416 |
| 2021/0361156 A1* | 11/2021 | Taylor | A61B 1/303 |
| 2022/0015620 A1* | 1/2022 | Truckai | A61B 1/307 |
| 2022/0296090 A1* | 9/2022 | Ouyang | A61B 1/00103 |
| 2022/0378400 A1* | 12/2022 | Yu | A61B 8/5215 |

* cited by examiner

| Parameter | Score | | | | Description |
|---|---|---|---|---|---|
| | 0 | 1 | 2 | 3 | |
| Cervical position | Posterior | Middle | Anterior | - | The position of the cervix changes with menstrual cycles and also tends to become more anterior (nearer the opening of the vagina) as labour becomes closer. |
| Cervical consistency | Firm | Medium | Soft | - | In primigravid women, the cervix is typically tougher and resistant to stretching, much like a balloon that has not been previously inflated (it feels like the bottom of a chin). With subsequent vaginal deliveries, the cervix becomes less rigid and allows for easier dilation at term. |
| Cervical effacement | 0-30% | 40-50% | 60-75% | 80+% | Effacement translates to how "thin" the cervix is. The cervix is normally approximately three centimetres long, as it prepares for labour, and labour continues, the cervix will efface until it is "fully effaced" (paper-thin). |
| Cervical dilation | Closed | 1-2 cm | 3-4 cm | 5+ cm | Dilation is a measure of how open the cervical os is (the hole). It is usually the most important indicator of progression through the first stage of labour. It is usually measured with fingers -1, 2, 3, or fully dilated: but recorded in centimetres (It is 10 cm when fully dilated). |
| Fetal station | -3 | -2 | -1, 0 | +1, +2 | Fetal station describes the position of the fetus's head in relation to the distance from the ischial spines, which are approximately 3-4 centimetres inside the vagina and are not usually felt. Health professionals visualise where these spines are and use them as a reference point. Negative numbers indicate that the head is further inside than the ischial spines and positive numbers show that the head is below the level of the ischial spines. |

SYSTEM, METHODS, AND DEVICES FOR CERVICAL EVALUATION

RELATED APPLICATIONS

This patent application claims the benefit under 35 U.S.C. § 119(e) of U.S. Provisional Patent App. No. 63/340,069, filed May 10, 2022, entitled "METHOD, SYSTEM, AND DEVICES FOR VIDEO/ENDOSCOPIC CERVICAL MONITORING IN LABOR," incorporated herein by reference in entirety.

BACKGROUND

Medical diagnostic devices have benefited from technological advances in miniaturization and visualization capabilities of endoscopic instruments. Real-time digital image measurement and quantifications methods, such as augmented reality, have allowed for a combination of real and virtual worlds, real-time interaction, and accurate 3D registration of virtual and real objects. Current methods of cervical and fetal positioning in labor are invasive, uncomfortable for the expecting mother, discontinuous, imprecise, and risk infection. There is a need for a safe, precise, minimally invasive approach to cervical and fetal position monitoring in labor.

SUMMARY

Configurations herein provide a cervical and fetal position visualization and monitoring device including a soft-tipped endoscope adapted for transvaginal placement, and a camera disposed at a distal end of the endoscope and adapted for capturing image data, and a tether for retraction at a proximal end. The camera captures images of the cervix and fetal position. A transmitter transmits the image data to an analysis processor for computing, quantifying, and displaying cervical diameter, effacement, fetal station, fetal head positioning, and other cervical parameters. The computed parameters are employed to trend and compute labor progression, allowing appropriate medical staff to be monitor progress and potentially intervene and modify clinical management. Continued positioning of the transvaginal endoscopic device during labor allows trending analysis for computing a rate of labor progression for estimating an imminent birth, at which time the device is quickly removed to allow unimpeded delivery.

Configurations herein are based, in part, on the observation that the human delivery process is a uniquely individual experience. Despite years of research and evolution of medical procedures in improved care to newborns and mothers, the actual birthing process remains elusive to prediction of duration and timing. Unfortunately, conventional approaches to tracking birthing progress suffer from the shortcoming that a digital "finger exam" or vaginal exam is often employed to access birthing progression by estimating cervical and fetal positioning change. The care provider inserts one or more digits into the birth canal to evaluate/estimate cervical (position, consistency, effacement, and dilation) and fetal (positioning and station). This approach is limited in accuracy due to the variance of finger sizes between caregivers and the subjective, unilateral conclusion drawn by the examining caregiver. There is variation in care providers' estimations, making such measurements less reliable. Moreover, repeated vaginal/finger examinations increase the risk of infection, such as chorioamnionitis.

Accordingly, configurations herein substantially overcome the shortcoming of conventional vaginal/finger exams by providing direct cervical and fetal positioning visualization and monitoring device that employs an endoscope to capture an image of the cervix and fetal station, and transmit the image data to an analysis processor for computing the changes in cervical diameter and effacement, fetal station, as well as other parameters, and computes a progression or score indicative of the rate of labor progression and estimates an imminent newborn delivery.

In further detail, a method for monitoring, reliably quantifying, computing, and trending cervical and fetal position characteristics during labor as disclosed herein includes placement of a transvaginal, soft-tipped endoscope, the endoscope having a camera at a distal end, and disposing the camera at an angle towards the cervix, such that the angle defines a field of view captured by the camera. The camera receives image data indicative of the cervix and fetal station changes, and wirelessly transmits the image data to a receiver. An analysis processor computes a cervical diameter, cervical effacement, fetal station, and other metrics from the image data, and displays the pre-labor scoring metrics for labor progress monitoring.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 5 show quantification of the cervical characteristics captured in the image data for computing a metric of birthing progression.

DETAILED DESCRIPTION

The cervical inspection device described below provides an accurate, low cost approach to conventional pre-delivery cervical examination by continually monitoring cervical characteristics such as dilation and effacement without the discomfort of repeated digital penetrations. An example implementation of a probe having the elements for video driven cervical examination is shown, along with alternative configurations varying in size, insertion and data transport. Additional configurations embodying the disclosed approach may be apparent to those skilled in the art.

Figure 1:
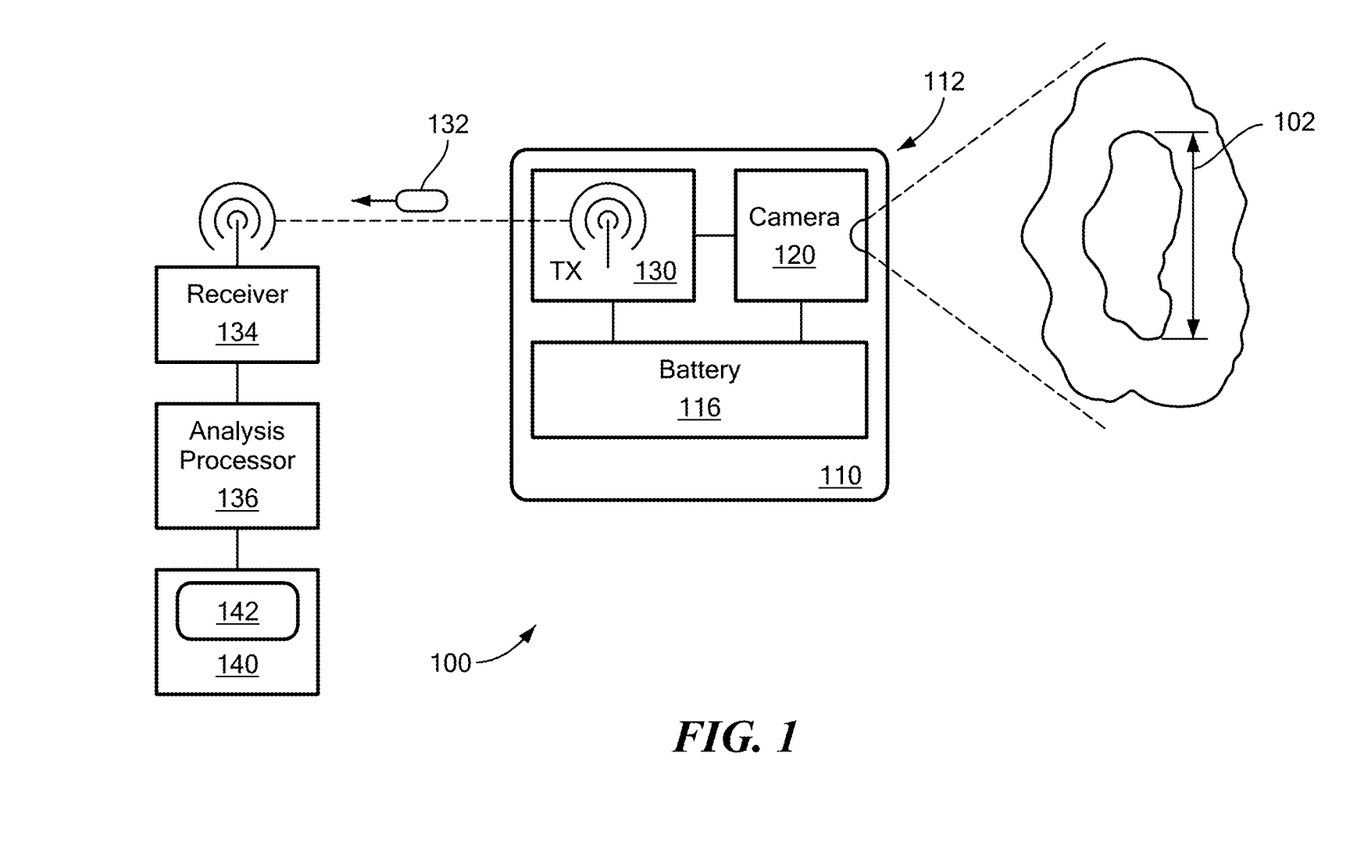
FIG. 1 is a schematic block diagram of the cervical inspection device as disclosed and claimed herein.

FIG. 1 is a schematic block diagram of the cervical inspection device as disclosed and claimed herein. Referring to FIG. 1, a cervical inspection device 100 takes the form of an elongated probe 110 having a narrow, annular body adapted for cervical insertion, and a camera 120 disposed at a distal end 112 of the body and adapted for capturing video data. A transmitter 130 connects to the camera 120 to transmit the video data 132 to an analysis processor 136 for computing a cervical diameter 102.

An interface to a receiver 134 is configured to receive the video data from the transmitter 130. In the example configuration, the transmitter 130 is a wireless transmitter for transmitting the video data 132 to the remote, untethered receiver 134 in communication with the analysis processor 136. Alternatively, a tethered, wired approach may be employed, however the wireless approach permits undisturbed patient placement combined with ambulatory mobility for allowing labor to progress and ease discomfort naturally associated with labor contractions.

The video data 132 may include image data defining visual images 142 received from the probe following advancement into a cervical region, and displayable on a rendering device 140. The video data 132 however, may be processed by the analysis processor based on gathered pixel based information from the video data 132, and need not be displayed. The pixel data denotes the cervix and a void or opening as the cervix widens in conjunction with emergence of the infant from the uterus. The pixel data also reveals the effacement—a thick, mucous "plug" or barrier which erodes as labor progresses.

Both the camera 120, wireless transmitter 130, and any accompanying LEDs or light source may be powered by a battery 116 or other suitable power source. As a moderately invasive devices, it may be distributed as a single use device with an enclosed battery. Rechargeable cells may also be employed.

Figure 2A:
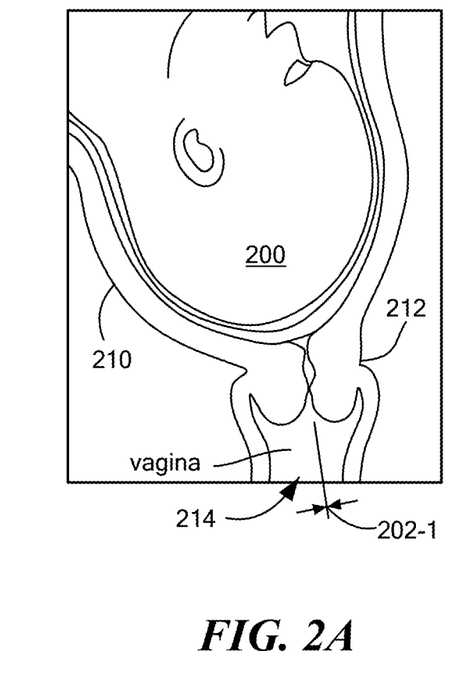
FIGS. 2A-2D show progression of a cervical diameter indicative of birthing progression.
Figure 2B:
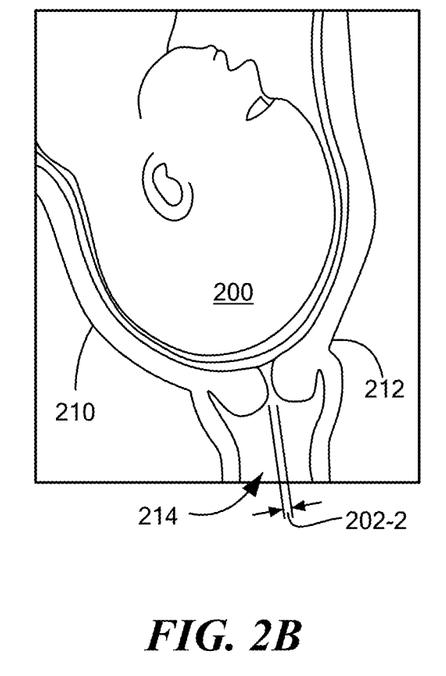
Figure 2C:
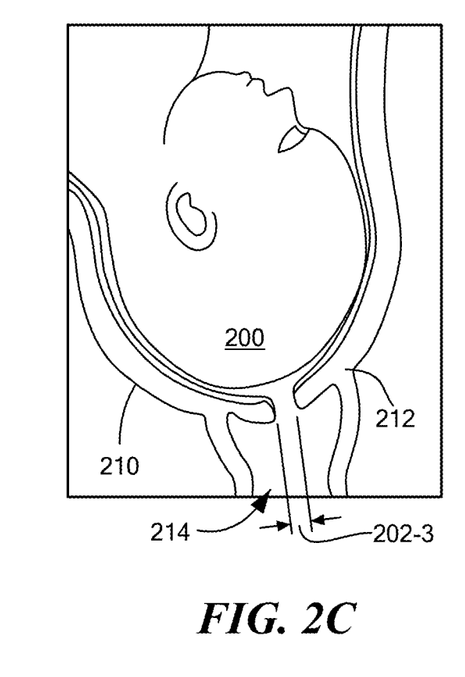
Figure 2D:
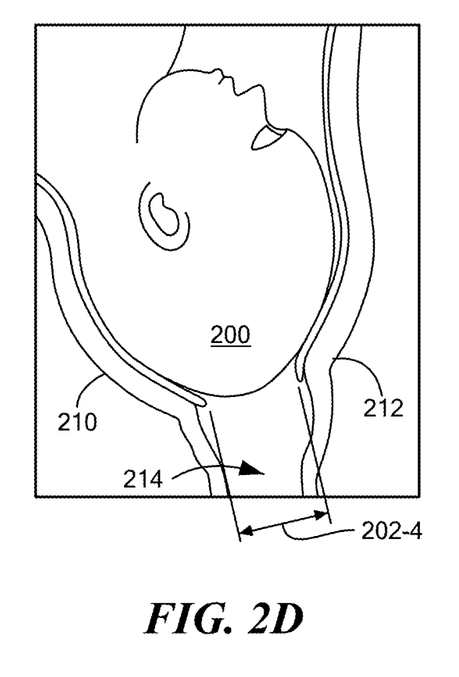

FIGS. 2A-2D show progression of a cervical diameter indicative of birthing progression. Referring to FIG. 1 and FIGS. 2A-2D, FIG. 2A shows a side anatomical view just prior to the head 200 "dropping," where the uterine contractions force the infant into the birth canal 214 for delivery and necessarily widening the cervix 212 to accommodate. FIG. 2B shows the cervix dilating to a diameter 202-2, from a near closed diameter 202-1, as the uterus 210 advances the head 200 downwards. FIG. 2C shows greater advancement to a cervical diameter of 202-3, and the walls of the cervix 212 become thinner, as the thick, circular muscle is forced to stretch to a greater circumference. FIG. 2D shows a greater dilation to diameter 202-4, and will continue to a delivery diameter of about 10 cm for passage of the infant from the uterus into the birth canal. Tracking of the diameter 202 and progression over time allows extrapolation of full dilation and timing of the resulting passage through the birth canal.

Figure 3A:
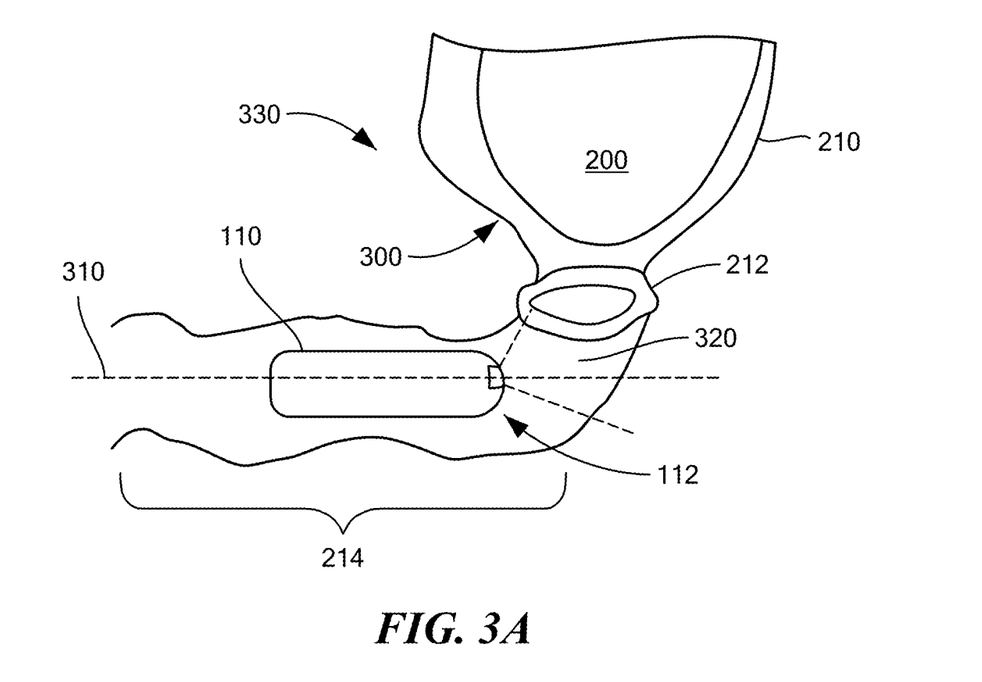
FIGS. 3A and 3B show the cervical inspection device disposed in a cervical region.
Figure 3B:
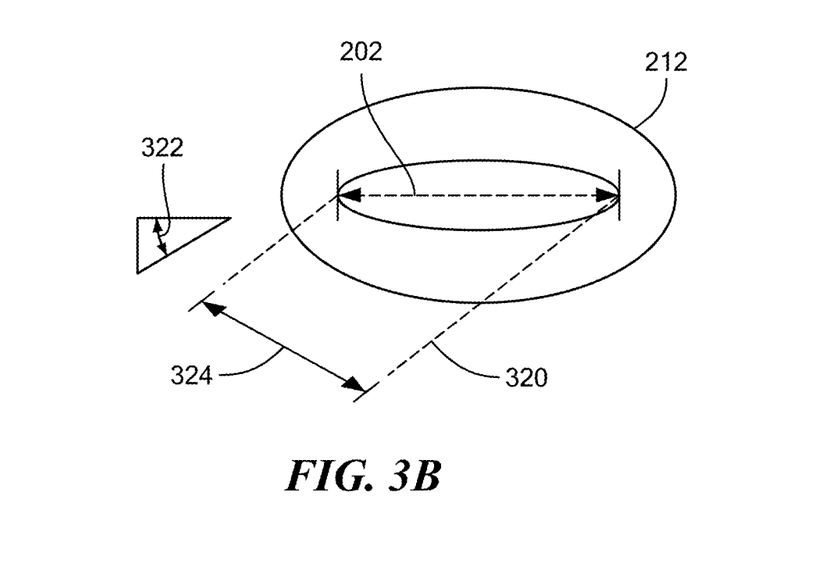

FIGS. 3A and 3B show the cervical inspection device disposed in a cervical region. Referring to FIGS. 1-3B, in FIG. 3A, a healthcare worker such as a labor and delivery nurse, doctor or midwife introduces the probe 110 into the birth canal 214 adjacent to and in a view range of the cervix. Unlike conventional, periodic digit estimations, the probe 110 has a soft and/or resilient surface and can remain for the duration of labor, and need only be removed upon imminent infant travel through the birth canal 214.

At the distal end 112, the camera 120 is generally forward facing having a field of view 320 based on an axis 310 aligned with a longitudinal dimension of the probe 110. The camera is positioned just below the cervix 212, and with illumination from an onboard LED, captures images as pixel data indicative of varied shades of the cervix 212. The pixel data depicts the cervix 212 and the diameter 202 of the opening, effacement, distinguished by different shades of the mucous texture, and the surrounding walls of the birth canal 214 and uterine exit. As the human anatomy has a natural shift or bend as the uterus 210 engages the birth canal 214, the camera may also be disposed at a slight at an angle towards the cervix 212, such that the angle defines a field of view captured by the camera 120.

Referring to FIG. 3B, the field of view (FOV) 320 may capture the video data 132 from an image denoting an angle of the FOV. The analysis processor 136 computes the cervical diameter 202 based on adjusting the received image data for parallax based on an angle 322 of the field of view 320. The analysis processor 136 then computes the cervical diameter 202 based on a greatest distance across the cervix 212, where the greatest difference may be different than a pixel distance based on a parallax resulting from the field of view 320.

Upon receiving the video data 132, the analysis processor 136 is configured to compute the opening diameter 202 of the cervix. In a wireless configuration, the receiver 134 receives the video data 132 wirelessly from the wireless transmitter 130 in the probe; The exchange may be via any suitable wireless medium, such as Bluetooth®, WiFi®, ZigBee®, cellular data, and or TCP/IP (Transmission Control Protocol/Internet Protocol) or combination of these. Miniature Bluetooth transmitters, for example, have a suitable form factor and can be powered from the onboard battery 116. The video data 132 typically comprises a series of message packets.

Once the video data 132 is captured and sent by the camera 110, the analysis processor 136 is configured to receive the video data 132 including an image denoting pixels representative of an open circumference of the cervix 212. The analysis processor 136 scales the image based on an anatomical distance defined by respective pixels in the image, and computes the diameter 202 of the open circumference based on an anatomical distance of a diameter defined by pixels representative of the cervix around an effacement region 324.

An initial calibration or setting may be employed to assist with scaling and determining the diameter 202 from the video data 132. The analysis processor 136 identifies, from the image data, an inner circumference of the cervix defining the cervical diameter, usually from varied shades of the muscle tissue of the cervix. The analysis processor identifies, from the video data 132, an effacement based on a shade of a region within the inner circumference. The effacement region 324 is a thick, gel-like mucous substance visibly discernible from the cervix 202 based on the video data 132. The analysis processor 136 computes the progression based on at least the cervical diameter 202 and the effacement. Other cervical parameters may also be ascertained and employed, discussed further below in FIG. 5.

Figure 4A:
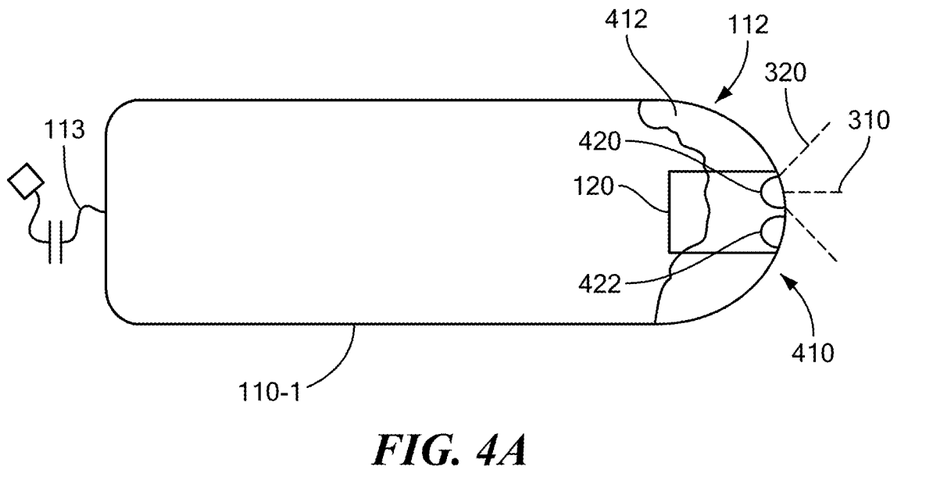
FIGS. 4A-4D show side views of various configurations of a probe defining the cervical inspection device.

FIGS. 4A-4D show side views of various configurations of a probe 110 defining the cervical inspection device. Referring to FIGS. 4A-4D, and continuing to refer to FIGS. 1-3B, alternate configurations of probes 110-1 . . . 110-4 are shown (110 generally). In FIG. 4A, the probe 110-1 includes a hemispherical surface 410 at the distal end 112 of the elongated probe, and a resilient and flexible coating 412 on the hemispherical surface. The hemispherical shape facilitates insertion, and the coating 412 is a soft, deformable and/or resilient material to avoid discomfort in the sensitive cervical region. It may be a polymer or textile; in a single-use device, fluidic absorbency would not pose an infection risk. The FOV 320 is centered around the axis 310 and includes the cervix 212. Also shown are the camera lens 420, focused on the FOV 320, and an adjacent LED or illumination source 422, to illuminate the region for accurate image gathering.

Figure 4B:
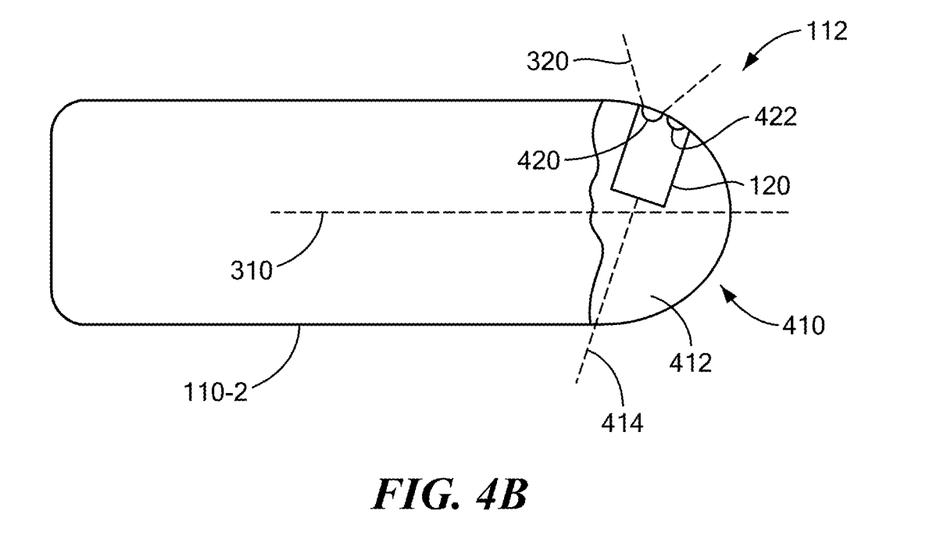

FIG. 4B depicts a side facing camera directed at an angle 414 from an axis aligned with the longitudinal dimension of the probe, on axis 310, such that the angle is based on an anatomy defining an angle between the birth canal 214 and a uterine opening.

Figure 4C:
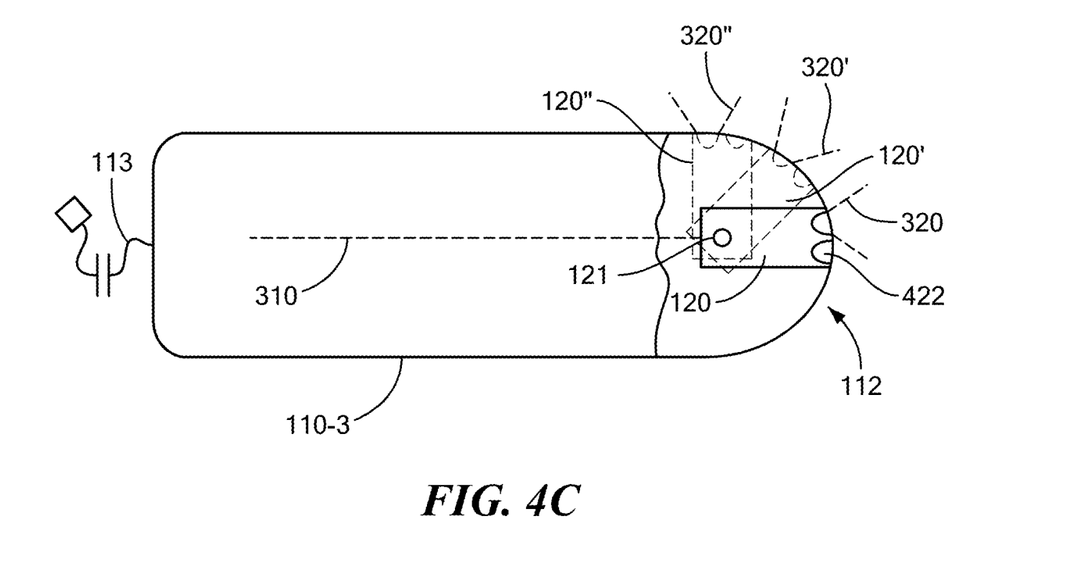

FIG. 4C depicts a pivotable mount 121 at the distal end 112, such that the camera 120 attached to the pivotable mount 121 allows for camera orientation at an angle based on a position of the cervix, shown by alternate positions 120', 120." The depicted angles are an example, and the pivotable camera angle is capable of continuous adjustment through a range, such as from 0° offset from axis 320 to 90°, directed upwards towards the cervix 212.

Figure 4D:
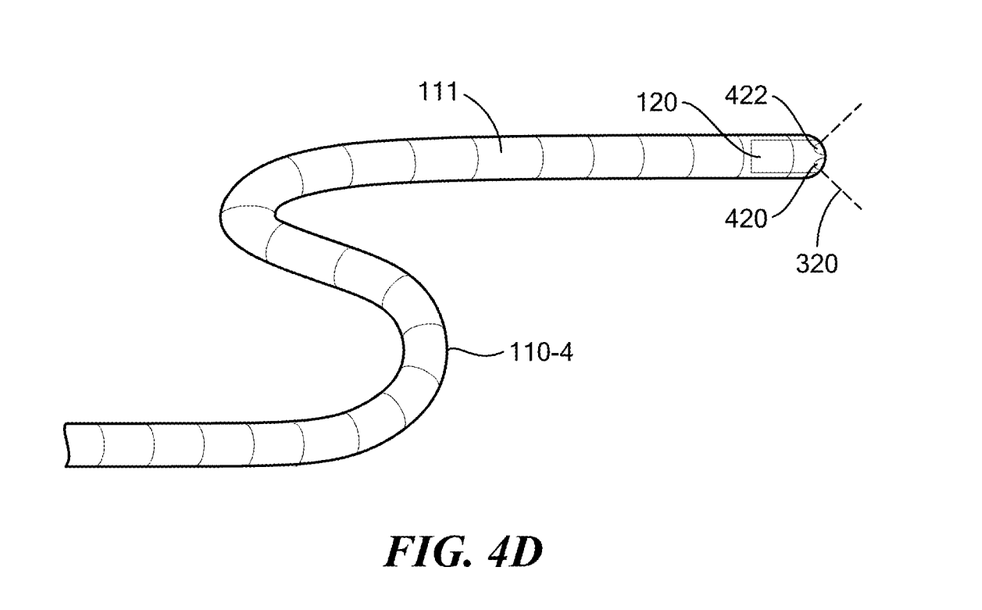

FIG. 4D shows an elongated probe 110-4 having a continuous width and circumference, and a flexible body as may be provided from a spring or coiled structure 111. The probe 110-4 extends the full length of the birth canal 214 and externally, and may be directly inserted and manipulated, such as to rotate the camera to an upwards facing angle. A tethered wired connection, in lieu of a wireless connection, may also be employed, since at least a portion of the body 110-4 remains external to the birth canal 214. The fully insertable form factor of FIGS. 4A-4C there may involve a tethered attachment 113 or linkage to an insertion/removal device.

FIG. 5 shows a quantification 502 of the cervical characteristics 504 captured in the image data for computing a metric of birthing progression. Referring to the chart 500 of FIG. 5, characteristics in addition to cervical dilation and cervical effacement may be considered by the analysis processor 136. The method for automatically computing cervical characteristics during labor using the probe 110 therefore includes receiving image data from the camera 120 attached or integrated into the probe 110 and disposed in the cervical region 330. The analysis processor 136 computes the cervical diameter 202 from the image data, and computes an estimate of birthing progression based on at least the cervical diameter.

The birthing progression may be expressed by computing a score indicative of anatomical dimensions of the cervix, such that the score includes a value based on the computed diameter, effacement and other characteristics 504. A typical quantification using the disclosed system may add the computed score 502 for each characteristic 504 and sum the results. One such score is the so-called "Bishop" test, which prior to configurations herein, relied substantially on subjective estimations and physical invasive examination.

Figure 6A:
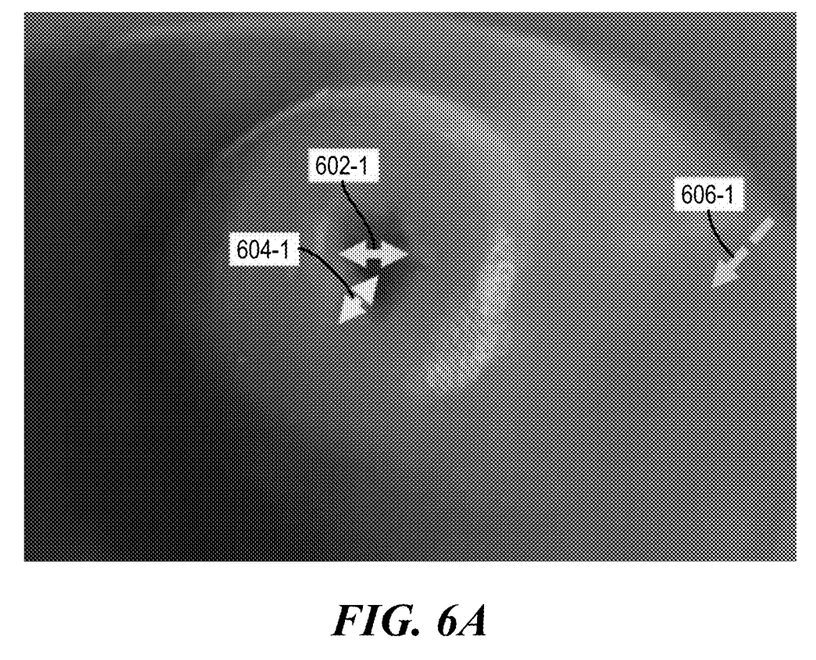
FIGS. 6A-6B show captured images by the apparatus of FIGS. 3A-3B for various parameters over time.
Figure 6B:
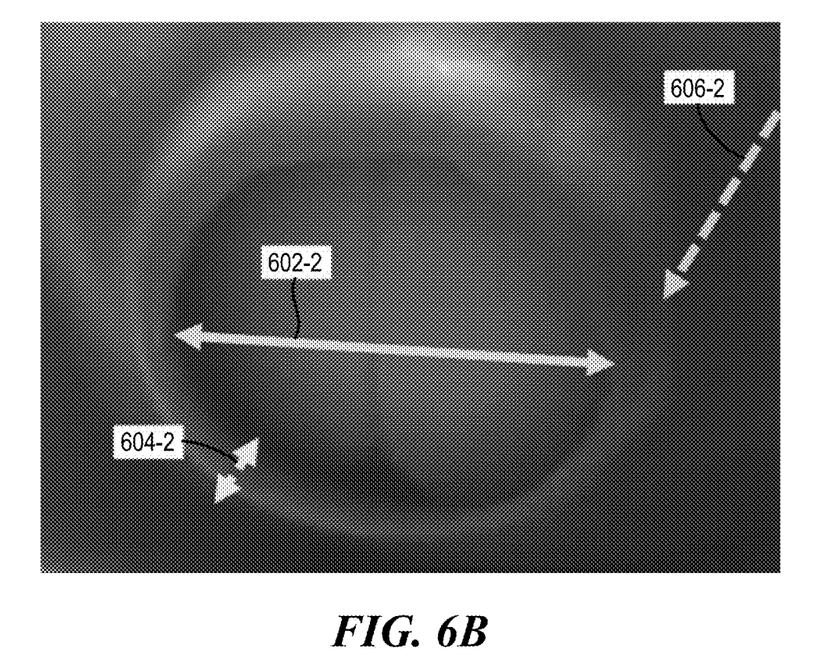

FIGS. 6A-6B show captured images by the apparatus of FIGS. 3A-3B for various parameters 504 over time. Referring to FIGS. 3A-3B and 6A-6B, FIG. 6A shows images taken at an onset of labor. Visualized parameters 504 as computed include a cervical dilation 602-1 of 0 cm, an effacement 604-1 of 0-30%, and a fetal station 606-1 of –3. Each of these parameters 602-1 . . . 602-3 can be employed in the Bishop score or other metric. FIG. 6B shows progression after 3 hours. In this example, (recall that labor progression can have wide variances upon each patient/occurrence) cervical dilation 602-2 has increased to 3-4 cm, effacement 604-2 increased to 60-70%, and fetal station 606-2 to +1.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A system for evaluating the uterine cervix, comprising:
a wireless endoscope within a housing having an elongated cylindrical body and a blunt, distal hemispherical tip adapted for transvaginal positioning, the housing comprised of malleable material configured for multi-directional pivotal movement about an axis to optimize camera angle for capturing cervical images;
at least one endoscopic camera configured about the axis at the distal hemispherical tip for directly visualizing and capturing the cervical images;
at least one light source for intracavitary illumination within the housing:
a processor configured for at least one of storing, transmitting, or analyzing the images;
a battery contained within the housing; and
a display for care provider or patient review of the cervical images.

2. The system of claim 1 further comprising a data transmitter and data receiver, the receiver configured to receive image data from the transmitter either locally or remotely.

3. The system of claim 2 wherein the transmitter is a wireless transmitter for transmitting the image data to a remote receiver in communication with the analysis processor.

4. The system of claim 1 wherein the endoscope's soft tip is directed towards the cervix.

5. The system of claim 1 wherein the image data includes still and/or video images captured by the transvaginally positioned soft-tipped endoscope.

6. The system of claim 1 wherein a field of view of the camera captures the entire cervical diameter.

7. The system of claim 1 wherein the processor is configured to compute, quantify, and analyze the image data related to cervical and fetal position parameters.

8. The system of claim 1 wherein the data display provides cervical and fetal positioning data quantification, labor progress calculations, image data, and/or alerts/notifications.

9. The system of claim 1 wherein the data display is locally attached to the endoscope or wirelessly transmitted for remote care provider monitoring.

10. The system of claim 1 wherein the image data captured by the video camera comprises a single image.

11. The system of claim 1, further comprising a pivot adapted for angular adjustment of the endoscopic camera at an angle towards the cervix.

12. The system of claim 1 wherein the cylindrical body has a continuous width and circumference and a length configured to extend the full length of the birth canal.

13. The system of claim 12 wherein the cylindrical body is configured for rotation within the birth canal, the camera facing a field of view based on both the rotation and the selected angle.

14. The system of claim 1 wherein the camera is disposed on a pivotal mount at the distal hemispherical tip inside the cylindrical body, wherein the pivotal mount is configured for pivotal movement about the axis at a selected angle for capturing the cervical images.

15. A method of evaluating the uterine cervix, comprising:
configuring a malleable wireless transvaginal endoscope with shape memory to optimize a camera angle for capturing cervical images;
safely positioning the wireless transvaginal endoscope, the endoscope housed within an elongated cylindrical body having a blunt distal hemispherical tip to gather endoscopic images of the cervix from an endoscopic camera configured to directly visualize the cervix;

at least one endoscopic camera configured about an axis at the distal hemispherical tip, the housing comprised of malleable material configured for multidirectional pivotal movement about an axis to optimize the camera angle for capturing cervical images and an integrated light source for intracavitary illumination;

displaying the endoscopic images; and analyzing the cervical appearance from the endoscopic images.

16. The method of claim 15 further comprising transvaginally positioning the endoscope and disposing a distal camera on the endoscope towards the cervix to capture the entire cervical diameter.

17. The method of claim 15 further comprising computing cervical dilation, cervical effacement, fetal station, and other pre-labor scoring parameters based on the endoscopic images.

18. The method of claim 15 wherein the display provides cervical and fetal positioning data quantification, labor progress calculations, image data, and/or alerts/notifications.

19. The method of claim 15 wherein the data display is locally attached to the endoscope or wirelessly transmitted for remote care provider monitoring.

20. A transvaginal endoscope, comprising:

an image-capturing wireless endoscope adapted for direct cervical visualization from at least one camera angled toward the cervix; and a cylindrical housing encasing the endoscope with an elongated body having a blunt distal hemispherical tip for safe transvaginal positioning, the housing comprised of malleable material configured for multidirectional pivotal movement about an axis to optimize a camera angle for capturing cervical images;

at least one endoscopic camera configured about the axis at the distal hemispherical tip for directly visualizing and capturing cervical images;

at least one light source for intracavitary illumination within the housing;

a processor configured for at least one of storing, transmitting, or analyzing the images; and a battery contained within the housing.

21. The endoscope of claim 20 wherein the endoscope is transvaginally positioned to both remain in situ while the patient is ambulatory and easily removed as needed.

22. The transvaginal endoscope of claim 20 wherein the elongated body has a soft, deformable or resilient material and a camera and lighting, the camera and lighting disposed in alignment for cervical imaging.

* * * * *